(12) United States Patent
Spicer

(10) Patent No.: US 7,540,245 B1
(45) Date of Patent: Jun. 2, 2009

(54) STRIP TILL IMPLEMENT

(76) Inventor: Seth Spicer, 34062 738 Rd., Enders, NE (US) 69027

( * ) Notice: Subject to any disclaimer, the term of this patent is extended or adjusted under 35 U.S.C. 154(b) by 303 days.

(21) Appl. No.: 11/498,384

(22) Filed: Aug. 3, 2006

(51) Int. Cl.
*A01B 49/04* (2006.01)
*A01C 5/00* (2006.01)

(52) U.S. Cl. .................................... 111/140; 111/152

(58) Field of Classification Search ............... 111/139, 111/140, 149, 152, 153, 200, 900
See application file for complete search history.

(56) References Cited

U.S. PATENT DOCUMENTS

| | | | |
|---|---|---|---|
| 5,351,635 A | 10/1994 | Hulicsko | 111/135 |
| 5,474,135 A * | 12/1995 | Schlagel | 172/151 |
| 5,640,914 A | 6/1997 | Rawson | 111/140 |
| 5,970,892 A | 10/1999 | Wendling et al. | 111/139 |
| 6,776,107 B1 | 8/2004 | Shoup | 111/140 |
| 6,871,709 B2 | 3/2005 | Knobloch et al. | 172/145 |

* cited by examiner

*Primary Examiner*—Christopher J. Novosad
(74) *Attorney, Agent, or Firm*—Dennis L. Thomte; Thomte Patent Law Office LLC

(57) ABSTRACT

A strip till implement comprising a cultivator shovel or sweep positioned forwardly of a planter unit or strip tillage implement so as to sweep trash from the strip with a minimum of soil or ground disturbance.

3 Claims, 4 Drawing Sheets

FIG. 2

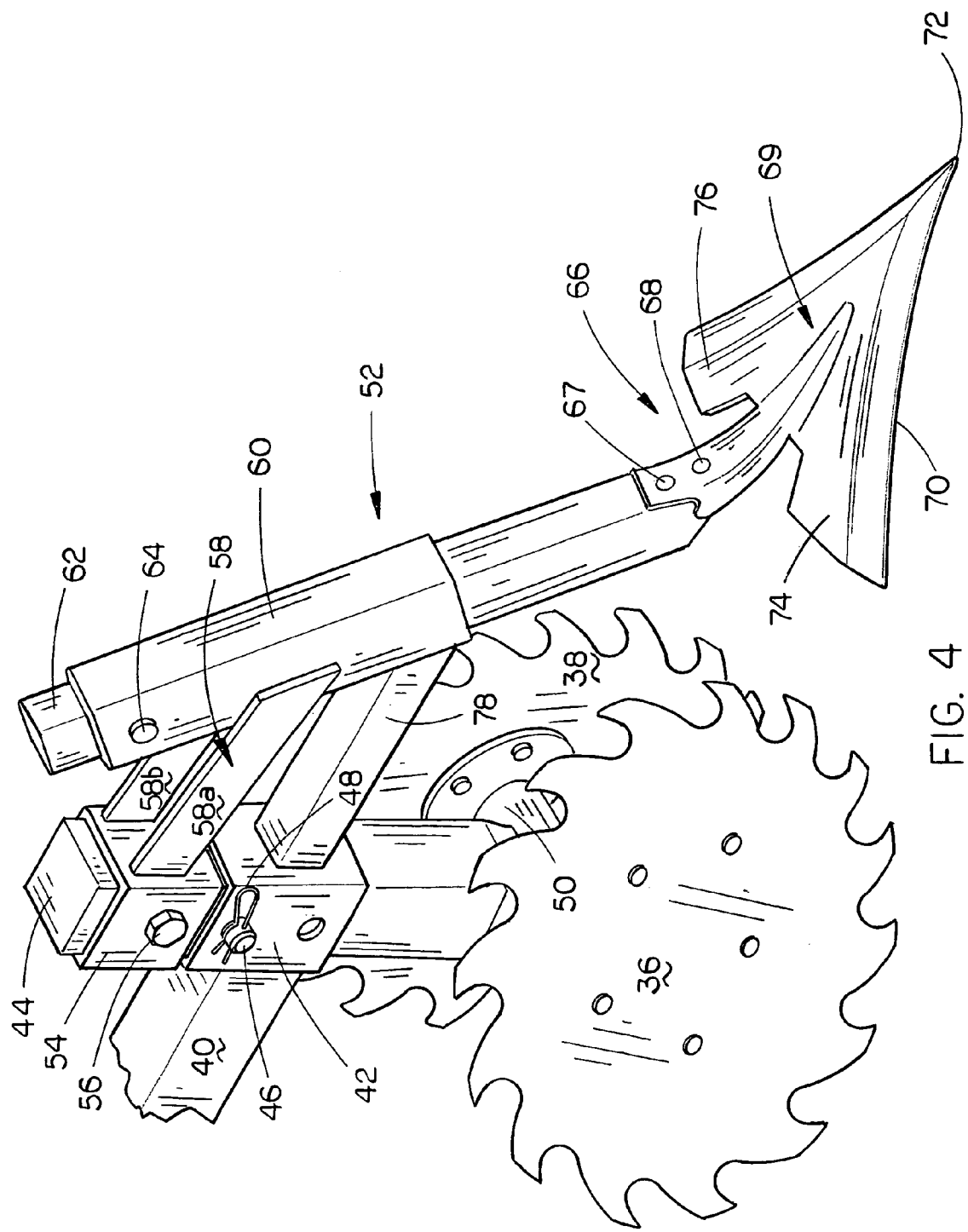

STRIP TILL IMPLEMENT

BACKGROUND OF THE INVENTION

1. Field of the Invention

This invention relates to a strip till implement and more particularly to a strip till implement which is used to remove crop debris or trash from the till strip in advance of a planter unit.

2. Description of the Related Art

Strip till farming has become increasingly popular since the early 1990s. Strip till farming involves tilling a field in strips with the strips being only 7-10 inches wide, leaving the rest of the field undisturbed. In some cases, the entire strip till farming operation is performed in a single pass while in other cases the strip till farming operation is performed in two passes. In the single pass strip till operation, the strips are tilled, cleared of trash or crop residue, fertilized and planted, usually in the spring. In the two pass strip till operation, the strips are normally tilled and fertilized in the fall and then planted in the spring. During the period from the fall tilling to the spring planting in the two pass strip till operation, trash (crop residue) may blow onto the tilled strip. In the spring, the fact that trash has blown onto the tilled strip results in difficulty in planting. Further, if the seeds are planted into the trash, proper germination of the seeds will not occur. One attempt to clear the trash from the strips in the spring, in the two pass operation, is to pull ground-driven row cleaning wheels along the strips, in advance of the planter unit, which are supposed to throw the trash laterally from the strips. Although the trash clearing wheels do work to some degree, they normally do not completely remove the trash from the strips which affects the germination of the seeds and thus the yield.

SUMMARY OF THE INVENTION

A strip till implement is disclosed which is used to remove crop debris or trash from the till strip in advance of a planter unit. The implement of this invention is used in combination with a laterally extending frame member or toolbar, having rearward and forward ends, with the toolbar being adapted to be pulled through a strip-tilled field by a tractor or the like. A plurality of horizontally spaced-apart planter units are mounted on the frame with each of the planter units being selectively movable from a raised inoperative position to a lowered seeding position. Each of the planter units has a pair of ground-driven trash cleaning wheels positioned forwardly thereof with the trash cleaning wheels being selectively movable between a raised inoperative position to a lowered operative position. Each of the planter units has a cultivator shovel positioned forwardly of the pair of trash cleaning wheels associated therewith. Each of the cultivator shovels includes a shovel body having a leading edge extending rearwardly and outwardly from opposing sides of a forward apex to respective rearward free ends of the shovel body. Each of the cultivator shovels is selectively movable between a raised non-operative positioned to a lowered operative position. The leading edges of the cultivator shovels, when the cultivator shovels are in their lowered operative position, are at approximately ground level so as to sweep trash on the strip laterally with a minimum of ground disturbance. The pairs of trash cleaning wheels, which are positioned rearwardly of each of the cultivator shovels, further clean the trash from the strip.

The cultivator shovels described above may be used in combination with a planter unit as described above or may be used with a primary strip tillage device when the strip till farming operation is conducted in two passes through the field. Further, in some cases, there will be no need for the trash cleaning wheels to be used on the toolbar forwardly of the planter unit or forwardly of the primary tillage implement.

It is therefore a principal object of the invention to provide an improved strip till planting implement.

A further object of the invention is to provide a strip till planting implement which comprises a cultivator shovel positioned forwardly of a primary tillage implement or forwardly of a planter unit so as to sweep crop residue or trash from the strip with a minimum disturbance of the ground.

Still another object of the invention is to provide a strip till planting implement which vastly improves the cleaning of a strip in a strip-tilled field.

Yet another object of the invention is to provide a strip till planting implement which may be added to conventional strip till planting units or strip tillage implements with a minimum of modification thereof.

These and other objects will be apparent to those skilled in the art.

BRIEF DESCRIPTION OF THE DRAWINGS

FIG. 4 is a front perspective view of the strip till planting implement of this invention.

DETAILED DESCRIPTION OF THE INVENTION

Figure 1:
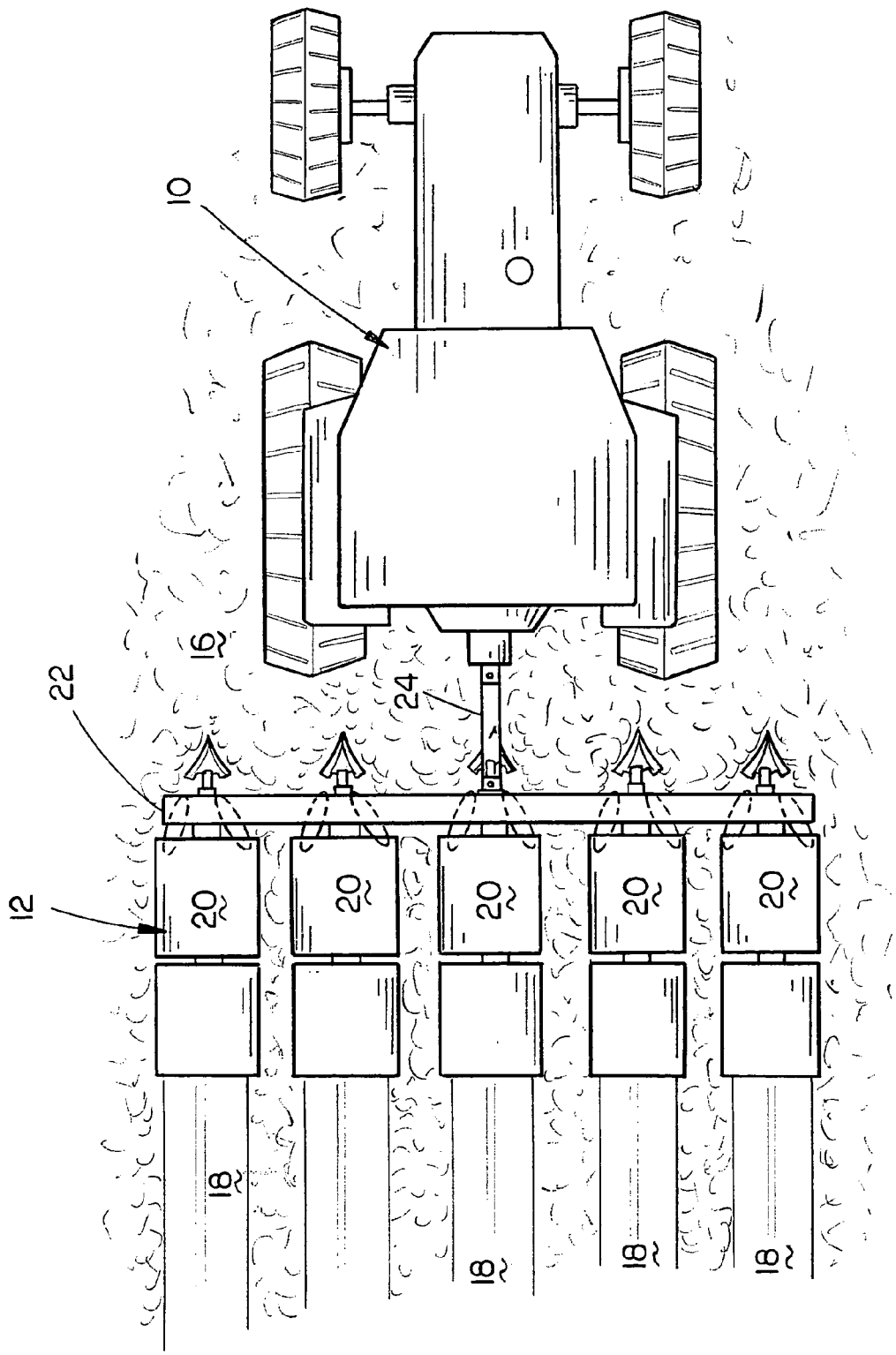
FIG. 1 is a top view illustrating a planter implement being pulled through the field by a tractor with the strip till implement of this invention being positioned forwardly of the planter units.

In FIG. 1, the numeral 10 refers generally to a conventional farm tractor or prime mover which is designed to pull a strip till planting unit 12 through a field 14 which is being strip-tilled and which has crop residue or debris (trash) 16 thereon which has blown onto the strips 18. The planter unit 12 normally includes a plurality of planter and fertilizer units 20 which are horizontally spaced-apart and which are mounted onto a tubular frame member or toolbar 22 which has a hitch 24 extending forwardly therefrom for connection to the tractor 10. The toolbar 22 is normally wheel supported and is raised and lowered by conventional means so that the planter units 20 may be moved from a raised inoperative position to a lowered operative or seeding position. Although the planter units 20 illustrated in the drawings are typical, any type of planter unit 20 may be utilized on the toolbar 22. Regardless of the particular type of planter unit 20 being utilized, the planter unit will normally have some sort of frame or support 26 which is secured to the toolbar 22 by a parallel arm connection generally referred to by the reference numeral 28. Normally, the planter units 20 will have a furrow closing wheel 30 mounted thereon as well as some sort of a seed tube 32 which extends downwardly into the ground for planting the seeds 34. All of the details of the planter unit 20 have not been shown, such as coulter wheels, etc., for purposes of clarity. Heretofore, all of the structure described above is conventional in nature.

In many instances, the planter units 20 will have a pair of ground-driven row cleaning wheels or trash cleaning wheels 36 and 38 positioned forwardly thereof for cleaning the trash 16 from the strip 18. In some cases, a support 40 is welded or otherwise secured to the frame 26 or some other part of the planter unit 20 and extends forwardly therefrom. In some instances, a vertically disposed sleeve or collar 42 is welded to the forward end of the support 40 and is adapted to receive a vertically extending shank or post 44 therein which is vertically adjustably mounted in the sleeve or collar 42 by means of pin 46 and key 48. Normally, the shank 44 will have a plurality of vertically spaced-apart and horizontally extending openings formed therein which vertically adjustably receive the pin 46 so that the height of the wheels 36 and 38 may be controlled relative to the planter 20. The wheels 36 and 38 are rotatably mounted on the opposite ends of an axle or support 50 which is secured to the lower end of the shank 44.

Figure 2:
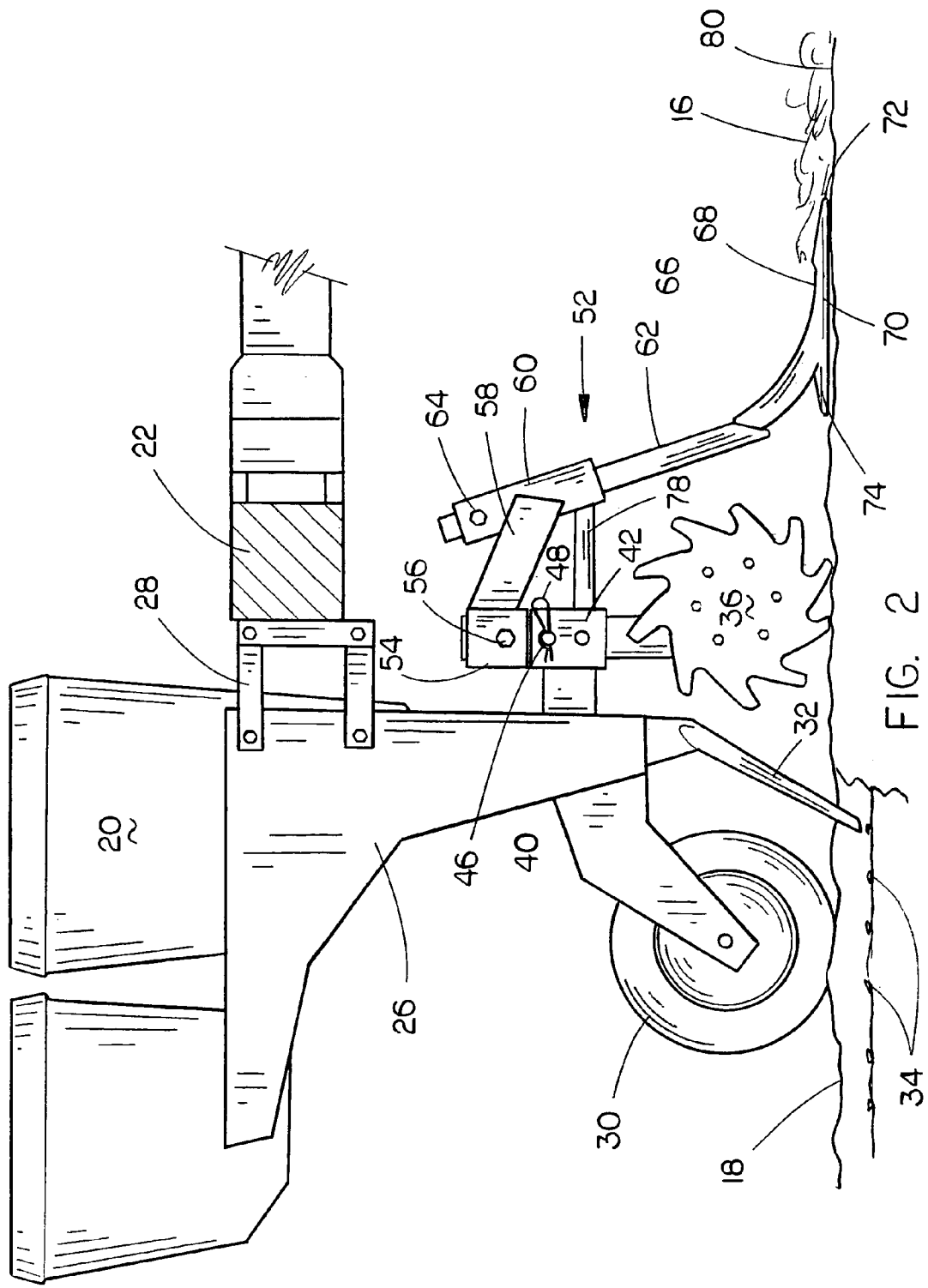
FIG. 2 is a side view of a planter unit wherein the strip till implement of this invention is positioned forwardly of a pair of trash cleaning wheels or row cleaning wheels.

The numeral 52 refers to the strip till implement of this invention which is positioned forwardly of the trash cleaning wheels 36 and 38. Implement 52 includes a collar or sleeve 54 which is vertically adjustably secured to the upper end of the shank 44 by means of bolt 56 extending therethrough. A support 58 is secured to collar 54 by welding or the like and extends downwardly and forwardly therefrom, as illustrated in FIG. 2. Support 58 may comprise a pair of spaced-apart plates 58a and 58b which have square tube 60 welded thereto. Support 58 may also comprise a tube which is notched at its forward end to receive the tube 60 therein and which is welded thereto. The tube 60 may be angularly inclined at any desired angle. The implement 52 also includes a square bar 62 which is adjustably received by the tube 60 and which is adjustably secured thereto by means of bolt 64 extending through one of several vertically spaced openings. Implement 52 also includes a cultivator shovel or sweep 66 which is secured to the lower end of the bar 62 by bolts 67 and 68 in conventional fashion. Shovel 66 includes a body portion 69 which has a leading edge 70 extending rearwardly and outwardly from opposing sides of a forward apex 72 to respective free ends or wings 74 and 76.

Figure 3:
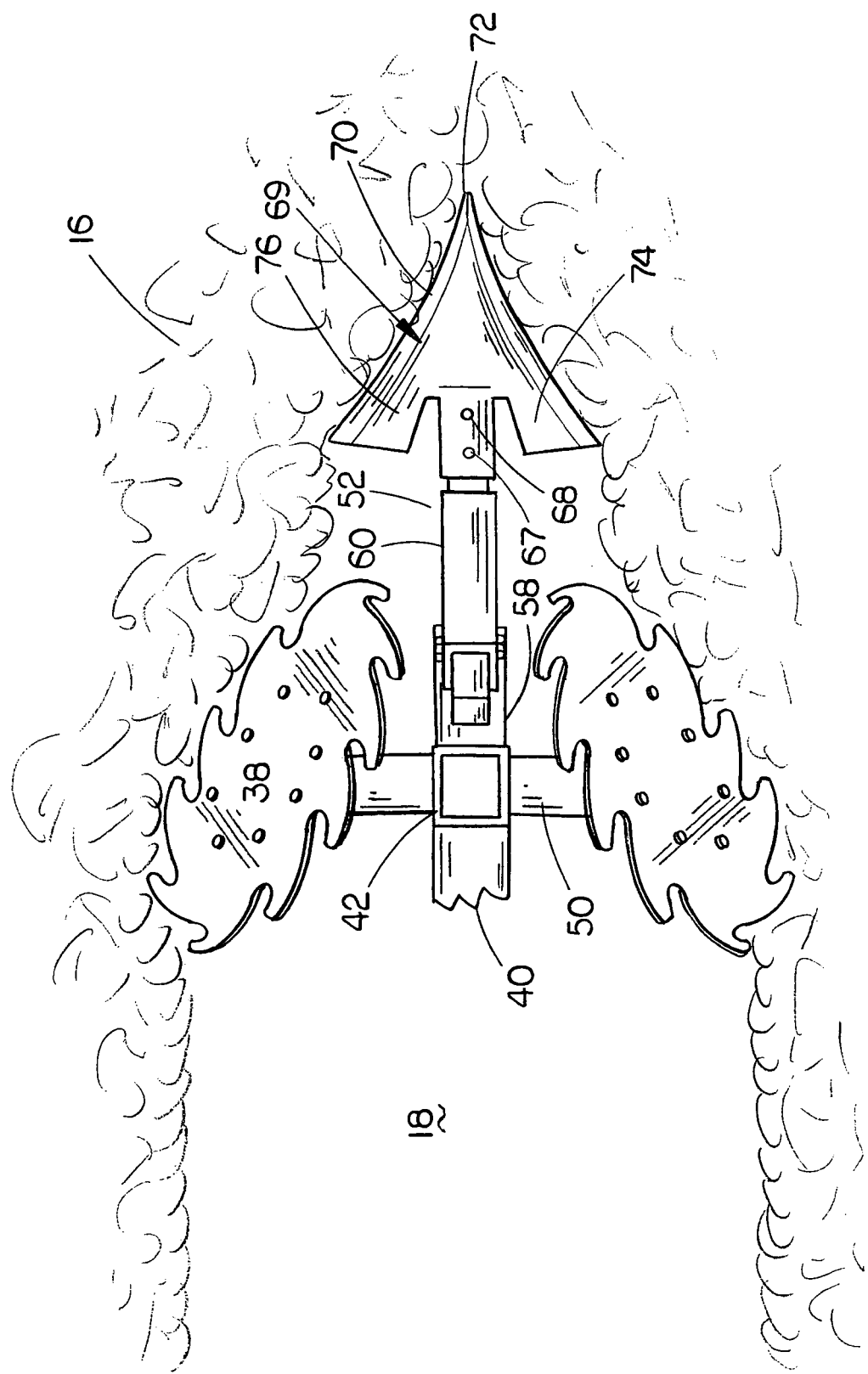
FIG. 3 is a top view illustrating the strip till implement of this invention clearing trash from a strip of a strip-tilled field.

In the drawings, the implement 52 is shown as being positioned forwardly of the wheels 36 and 38, but in some cases, the wheels 36 and 38 will not be utilized. Further, although the implement 52 is shown to be used with a planter unit in a strip till implement, the implement 52 could be used in a strip tillage implement which does not include a planter unit such as would be omitted in the first pass of a two pass strip tilling operation. The implement 52 is designed to be vertically movable with the planter unit 20 and includes a rearwardly extending brace 78 which is secured to the lower end of the square tube 60 and which abuts against the forward end of collar 54. When the planter unit 20 is in its lowered operative position, the cultivator shovel or sweep 66 is vertically positioned so that the apex 72 and the leading edge 70 of the shovel 66 are at ground level so as to engage the trash 16, as illustrated in FIGS. 2 and 3, so as to sweep the trash laterally outwardly with respect to the strip 18 to clear the strip of the crop residue or trash so that the planter may plant the seeds in a trash-free strip which will enhance the germination and yield of the crop. The purpose of the shovel 66 is to merely skim along the ground surface 80 to sweep the debris outwardly to remove the debris therefrom with a minimum of soil being disturbed. If the shovel 66 were permitted to penetrate the ground to a substantial depth, a trough would be created therein which would detract from the planting operation occurring rearwardly thereof.

It can therefore be seen that a novel means has been provided for clearing trash or crop residue from a strip in a strip-tilled field with a minimum of ground disturbance.

Thus it can be seen that the invention accomplishes at least all of its stated objectives.

I claim:

1. An apparatus for sweeping trash outwardly from a till strip, comprising:
    a transversely extending toolbar having a plurality of horizontally spaced-apart strip till implements mounted thereon which are movable between a raised inoperative position to a lowered operative position;
    a cultivator shovel operatively secured to each of the strip till implements forwardly thereof and being vertically movable therewith between a raised non-operative position to a lowered operative position;
    each of said cultivator shovels including a shovel body having a leading edge extending rearwardly and outwardly from opposing sides of a forward apex to respective rearward free ends of the shovel body;
    said leading edges of said cultivator shovels, when said cultivator shovels are in their lowered operative position, being at approximately ground level so as to sweep trash on the ground laterally with a minimum of ground disturbance;
    a pair of trash cleaning wheels positioned rearwardly of each of said cultivator shovels further cleaning trash from the strip by sweeping the trash laterally outwardly from the strip.

2. The apparatus of claim 1 wherein said cultivator shovels are selectively vertically adjustably secured to said strip till implements.

3. The apparatus of claim 1 wherein said pairs of trash cleaning wheels are selectively vertically adjustably secured to said strip till implements.

* * * * *